United States Patent

Bentz et al.

[11] 3,852,255
[45] Dec. 3, 1974

[54] SHAPED STRUCTURES OF ACRYLONITRILE POLYMERS CONTAINING ANTISTATIC ADDITIVES

[75] Inventors: Francis Bentz, Cologne; Dieter Brokmeier, Dormagen; Ulrich Reinehr, Dormagen; Günther Nischk, Dormagen, all of Germany

[73] Assignee: Bayer Aktiengesellschaft, Leverkusen, Germany

[22] Filed: Feb. 13, 1974

[21] Appl. No.: 442,202

[30] Foreign Application Priority Data
Feb. 13, 1973 Germany.............................. 2306920

[52] U.S. Cl... 260/88.7 R, 260/32.6 N, 260/45.9 R, 260/79.3 M, 260/85.5 N, 260/DIG. 19
[51] Int. Cl...... C08f 3/76, C08f 15/22, C08f 45/60
[58] Field of Search...... 260/85.5 R, 85.5 S, 85.5 N, 260/88.7 R, 88.7 B, 88.7 F, DIG. 19, 45.9 R

[56] References Cited
UNITED STATES PATENTS

| | | | |
|---|---|---|---|
| 3,144,468 | 8/1964 | Hoover et al. | 260/45.9 R |
| 3,332,912 | 7/1967 | Rochlitz et al. | 260/DIG. 19 |
| 3,555,115 | 1/1971 | Bottomley et al. | 260/45.9 R |

*Primary Examiner*—Harry Wong, Jr.
*Attorney, Agent, or Firm*—Plumley & Tyner

[57] ABSTRACT

Shaped structures of 85 – 99.5 percent by weight of an acrylonitrile polymers and 0.5 – 15 percent by weight of an antistatic additive being a polyether urethane compound of the general formula

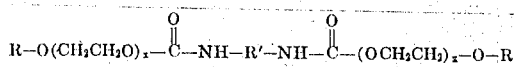

6 Claims, No Drawings

SHAPED STRUCTURES OF ACRYLONITRILE POLYMERS CONTAINING ANTISTATIC ADDITIVES

This invention relates to shaped structures, especially filaments, fibres and films, of acrylonitrile polymers with permanently antistatic properties.

Shaped structures of synthetic polymers, for example fibres of polyacrylonitrile, generally have the unfavourable property of developing electrical charges. Troublesome electrical charging of this kind occurs when the fibres have a surface resistance of more than $10^{12}$ $\Omega$.

Attempts have been made to reduce electrostatic charging in shaped structures of this kind, by subjecting the fibres or textile products produced from them to a surface treatment with antistatic preparations so increasing their electrical conductivity. However, washing often eliminates the antistatic effect.

An antistatic finish can be obtained by applying aqueous solutions of suitable agents to the fibres in aquagel form (cf. German offenlegungsschrift 1,469,913 and 1,965,631).

It is also known that polyacrylonitrile for example can be mixed with a second acrylonitrile polymer containing from 30 to 80 % by weight of a polyethylene oxide methacrylate, and the resulting mixture spun (German Offenlegungsschrift 1,645,532).

Another method often used for reducing the static charging of shaped synthetic polymers is to add polyethers or other suitable compounds to the solution or to the melts of these polymers before shaping. However, it is extremely difficult to find laundry-stable compounds of this kind. Most additives cause to the following disadvantages. When the fibres are washed, some of the compound added is washed out and the fibres loose their gloss and take on a dull appearance attributable to the so-called "soil-hiding effect."

It has now been found, that compounds obtained by reacting ethoxylated alcohols and diisocyanates, provide fibres of acrylonitrile polymers with a laundry-stable, i.e. permanent, antistatic finish without reducing the light stability of these polymers.

This is surprising since it is known that urethane groups adjacent to a polyether group are not altogether resistant to hydrolysis. Another extremely surprising factor was that fibres containing additives of this kind do not contain any vacuoles, since additives of this kind generally give rise to considerable vacuole formation in the fibres.

It is therefore an object of this invention, to provide shaped structures, especially filaments, fibers and films, of polyacrylonitrile with permanently antistatic properties.

It is a further object to avoid the disadvantages and difficulties described above.

Other objects will be evident from the following description and the examples.

These objects are accomplished by a shaped structure consisting of from 85 to 99.5 percent by weight of an acrylonitrile polymer and as an antistatic agent of from 0.5 to 15 percent by weight of a polyether diurethane compound of the general formula

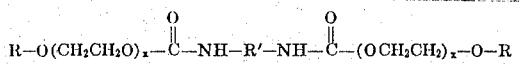

in which
R represents a $C_{1-18}$-alkyl, cycloalkyl, aryl, aralkyl or alkaryl radical, said radicals being halogen- or alkylsubstituted or not
x is an integer from 5 to 50, and
R' represents a bivalent alkyl or aryl or aralkyl or alkaryl or cycloalkyl radical.

The polyethers containing urethane groups according to the invention combine several advantages, namely outstanding compatibility with the polymers; high resistance to washing; outstanding antistatic behaviour of the polyacrylonitrile fibres containing these additives; the complete absence of vacuoles in the fibres; providing the fibres with a glossy appearance; and finally no yellowing of the fibres.

The shaped structures according to the invention are obtained by adding to solutions of the acrylonitrile polymers a polyether diurethane compound of the above formula in a quantity of from 0.5 to 15 % by weight (based on the polymer mixture), and removing the solvent during the shaping process.

In the context of the invention, shaped structures are primary filaments, fibers and films.

The polyether diurethane compounds are preferably added in a quantity of from 2 to 10 percent by weight, based on the polymer mixture.

The group of acrylonitrile polymers includes in particular polyacrylonitrile or copolymers of acrylonitrile with (meth) acrylic acid esters like for example (meth)acrylic acid methyl ester and (meth)acrylic acid ethyl ester, (meth) acrylamides like for example (meth) acryl amide and N,N-dimethyl (meth) acryl amide, N-vinyl lactamates like for example N-vinyl pyrrolidone, vinyl-, (meth)-allyl esters or ethers, vinyl (idene)-halides like for example vinyl(idene)chloride and vinyl-(idene)bromide, alkylvinylpyridine like for example N-vinyl-4-methyl pyridine, vinyl imidazoles, (mono) dialkylaminoalkyl (meth) acrylates like for example dimethyl amino ethyl (meth) acrylate and their quarternised derivatives, vinyl-, (meth) allyl sulphonic acids, vinyl-, and (meth) allyl phosphonic acids or their esters, containing at least 60 percent by weight of acrylonitrile in copolymerised form.

The polyether diurethane compounds corresponding to the above formula are produced by methods known per se. Aliphatic alcohols or phenols such as, for example, butyl alcohol, 2-methyl-4-butanol, 1-nonanol, 1-dodecanol, myristyl alcohol, cetyl alcohol, stearyl alcohol and i-nonylphenol, are reacted in the melt with alkylene oxides, preferably ethylene oxide, in the presence of a basic catalyst, for example alkali hydroxide. One mol of the corresponding alcohol or phenol is reacted with 5 to 50 mols and preferably with 10 to 35 mols of alkylene oxide. After the OH-number has been determined, the polyethoxylated alcohols obtained can be reacted very easily with diisocyanates. The reaction is preferably carried out in the melt at a temperature of from 70° to 150°C and preferably at a temperature of 90° to 130°C. The reaction can also be carried out in an inert solvent such as dimethyl formamide for example. The reaction is preferably carried out with a molar ratio of ethoxylated alcohol to diisocyanate of 2:1. The reaction time is between 30 minutes and 12 hours and preferably between 1 and 7 hours.

Preferred diisocyanates are cyclohexane-1,4-diisocyanate, isophorone diisocyanate, 1,3-phenylene diisocyanate, 1,4-phenylene diisocyanate, tolylene-2,4- diisocyanate, 1,5-naphthylene diisocyanate, diphenylmethane-4,4'-diisocyanate and 2,2-bis-(4-isocyanatophenyl)-propane. However, it is also possible to use a number of other diisocyanates.

The polyethers which contain two urethane groups are added to the spinning solution of the acrylonitrile polymer either in solid form or as a solution in dimethyl formamide, in a quantity of from 0.5 to 15 percent by weight and preferably in a quantity of from 2 to 10 percent by weight, based on the polymer mixture. In cases where the additives are synthesised in dimethyl formamide for example, the solution of the additives can be directly added to the spinning solution in the required quantity.

The surface resistance of the shaped structures according to the invention, especially fibres, as quoted in the Examples, was determined in accordance with DIN draft 54345 using a standard high-ohm meter, of the kind manufactured by the Knick Company, between the plates of two electrodes 1 cm apart at a measuring voltage of 100 V. For this purpose, the fibre material was conditioned for 72 hours under normal climatic conditions (23°C/50 percent relative humidity) before each measurement. Fibres produced in accordance with the invention have an electrical surface resistance of from $10^{10}$ to $10^{11}$ Ω at 23°C/50 percent relative humidity.

The fibres according to the invention can be dyed with the usual dyes without any deterioration in the fibres outstanding anti-electrostatic character. The fibres can be used with particular advantage for application requiring subsequent antistatic finishing, for example curtains. In this case, no dust is attracted through static electricity, neither can be retained, even by tacky preparations.

In the following Examples, which are to further illustrate the invention without limiting its parts by weight are to parts by volume as kg are to litres.

EXAMPLE 1 a. Preparation of

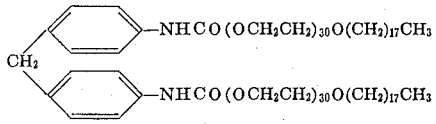

270.5 parts by weight of stearyl alcohol and 4 parts by weight of NaOH are introduced into a 3-necked flask equipped with a stirrer and a reflux condenser. After the air has been displaced from the flask with nitrogen, ethylene oxide is introduced at 100°C up to an increase in weight of 1320 parts by weight. The molecular weight is determined by measuring the OH-number.
OH % = 1.06
molecular weight: approximately 1600

For neutralisation, 60 parts bei weight of pure acetic acid are added to 1,592 parts by weight of this polyether, followed by heating for 1 hour at 100°C. The excess acetic acid is then distilled off in a water jet vacuum, at an oilbath temperature of 100°C. 125 parts by weight of 4,4'-diphenyl methane diisocyanate are introduced in portions at this temperature while a gentle stream of nitrogen is passed over. The reaction product is taken up in 5710 parts by volume of dimethyl formamide.

b. Production and testing of polyacrylonitrile fibers.

A 29 percent dimethyl formamide solution, consisting of a mixture of 95 percent by weight of a polyacrylonitrile (K-value: 81) and of 5 percent by weight of the polyethylene oxide diurethane, is prepared with the solution of Example 1a). This solution was dry spun with a viscosity of about 75 to 80 seconds at 80°C (the time is measured in which a ball of V2-steel according to DIN 5401 in a tube, filled with the solution to be measured, and having an internal diometer of 3 cm falls from one marking to another, the distance between said markings being 7 cm.)

Denier of the fibres: dtex 3.3.

The anti-electrostatic activity of the addition was determined by measuring the surface resistance of the fibres at 23°C/50 percent relative humidity. Value after 10 washes: $6 \cdot 10^{11}$ Ω.

Dyeability is determined as follows:

1 g of dye per litre of solution prepared is weighed on an analytical balance and dissolved in hot distilled water. 1 ml of acetic acid (30 g/1) and 1 ml of sodium acetate (40 g/1) are then added. This followed by filling up to the calibration mark at 20°C. The solution is obtained in this way.

500 mg of fibres are heated under reflux for 1.5 hours in 100 ml of the above solution. After the fibres have been removed from the solution and rinsed, they are boiled for 30 minutes in distilled water. The extinction of the fibres is then measured.

The following measurements are taken for a blue dye of the formula

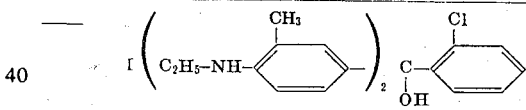

at 570 mμ; 1 cm cell,
and for a red dye of the formula

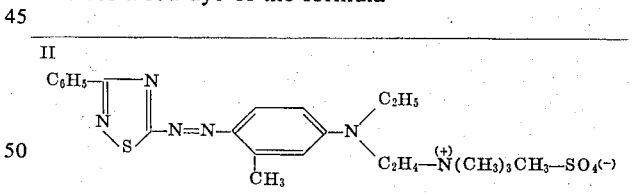

at 530 mμ, 1 cm cell;
dyeability red, formula II, 530 mμ:
 Extinction/Film weighed in = 13.6 ($g^{-1}$) (Comparison: 9.0)
Dyeability blue, formula I, 570 mμ:
 Extinction/Film weighed in = 9.3 ($g^{-1}$) (Comparison: 6.1)

In order to determine natural colour, 2.5 g of polyacrylonitrile are dissolved in 50 ml of dimethyl formamide, and the natural colour measured at 20°D in a 1 cm cell at 420 mμ.

Natural colour: d.127 (Comparison: 0.112)

Heat stability is measured by determining extinction at 420 mμ after heating of the samples at 90°C and 130°C. Result of tempering at 90°C: 0.56 (Comparison:

0.132) Result of tempering at 130°C: 0.299 (Comparison: 0.326).

The comparison values given in brackets were determined on a fibre of a polymer comprising 93.5 percent by weight of acrylonitrile, 5.5 percent by weight of methylmethacrylate and 1 percent by weight of methacroylamino benzene benzene disulphonimide.

EXAMPLE 2

A 29 percent dimethyl formamide solution, consisting of a mixture of 90 percent by weight of a polyacrylonitrile (K-value: 82) (containing as comonomers acrylonitrile (93.5 percent by weight), methacrylate (5.5 percent by weight) and methacroylamino benzene benzene disulphonimide (1 percent by weight) and of 10 percent by weight of the polyethylene oxide diurethane, is prepared with the solution of the polyethylene oxide diurethane in dimethyl formamide described in Example 1a). This solution was dry spun with a viscosity of about 80 to 90 seconds by the balldrop method at 80°C (measured as in Example 1b). The fibres had a denier of dtex 17.

The fibres show the following surface resistance values:
after production: $3 \times 10^{10}$ Ω
after the $10^{th}$ wash: $2 \times 10^{10}$ Ω

Since the polyacrylonitrile used in the mixture contained an acid comonomer, it was possible by dyeing the fibres obtained from the mixture to determine whether the anti-electrostatic effect was lost in this way. The fibres were dyed with the red basic dye of formula II and with the blue dye of formula I by the method normally used for acrylic fibres, and the surface re-measured, resistance value re-measured, to $3 \times 10^{10}$ Ω. The dyed fibres had a surface resistance of $4 \times 10^{10}$ Ω after being washed 3 times.

Dyeability, natural colour and heat stability were determined as in Example 1b).
Dyeability (formula II dye 530 mμ):
  Extinction/Film weighed in = 12.5 ($g^{-1}$) (Comparison: 9.4)
Dyeability (formula I dye 570 mμ):
  Extinction/Film weighed in = 8.9 ($g^{-1}$) (Comparison: 6.9)
Natural colour: 0.154 (Comparison: 0.112)
Tempering at 90°C (420 mμ): 0.206 (Comparison: 0.132)
Tempering at 130°C (420 mμ): 0.363 (Comparison: 0.326)

The comparison values given in brackets were measured on a fibre of a polymer comprising 93.5 percent by weight of acrylonitrile, 5.5 percent by weight of methylmethacrylate and 1 percent by weight of methacroylamino benzene benzene disulphonimide.

EXAMPLE 3 a. Production of

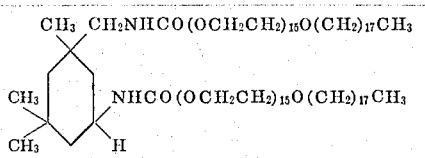

Stearyl alcohol is ethoxylated 15 times and treated with acetic acid as described in Example 1a).

OH %: 1.82
molecular weight: about 930

After the excess acetic acid has been distilled off, 111 parts by weight of isophorone diisocyanate are added in portions to 928 parts by weight of the polyether at 100°C while nitrogen is passed over. The reaction is exothermic. The reaction mixture is then stirred for 7 hours at 100°C, and is then taken up in 3460 parts by weight of dimethyl formamide. b. Production and testing of polyacrylonitrile fibres. A 29 percent dimethyl formamide solution, consisting of 95 percent by weight of a polyacrylonitrile (K-value: 82) and of 5 percent by weight of the polyethylene oxide diurethane of Example 3a), is prepared from this solution. The solution was dry spun (viscosity: 75 – 80 seconds by the ball-drop method at 80°C [measured as in Example 1b)]. Denier of the fibres: 3.3 dtex.

The electrical surface resistance of the fibres amounted to $2 \times 10^{11}$ Ω after the 10th wash, and to $2 \times 10^{11}$ Ω after drying with the formula I dye and 3 washes. Dyeability (formula I blue dye 570 mμ):
  Extinction/Film weighed in = 11.05 ($g^{-1}$)
  Comparison:
  Extinction/Film weighed in = 7.0 ($g^{-1}$).

The comparison value given in brackets was determined on a fibre of a polymer of 93.5 percent of acrylonitrile, 5.5 percent by weight of methylmethacrylate and 1 percent by weight of methacroylamino benzene benzene disulphonimide.

We claim:
1. A shaped structure consisting of from 85 to 99.5 percent by weight of an acrylonitrile polymer containing at least 60% by weight of acrylonitrile in polymerized form and as an antistatic agent of from 0.5 to 15 % by weight of a polyether diurethane compound of the general formula

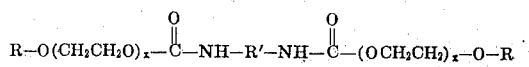

in which
R represents a $C_{1-18}$ -alkyl, cycloalkyl, aryl, aralkyl or alkaryl radical, said radicals being halogen- or alkylsubstituted or not,
x is an integer of 5 to 50, and
R' is a bivalent alkyl or aryl or aralkyl or alkaryl or cycloalkyl radical.

2. The shaped structure of claim 1, wherein in the general formula said bivalent radical R' is

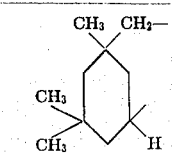

3. The shaped structure of claim 1, wherein in the general formula said bivalent radical R' is

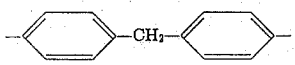

4. A shaped structure consisting of 90 to 98 percent by weight of an acrylonitrile polymer containing at least 60% by weight of acrylonitrile in polymerized form and as an antistatic agent of from 2 to 10 percent by weight of a polyether diurethane compound of the general formula

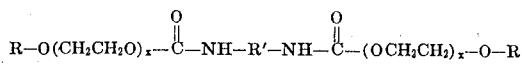

in which
R represents a $C_{1-18}$-alkyl, cycloalkyl, aryl, aralkyl or alkaryl radical said radicals being halogen- or alkyl-substituted or not,
$x$ is an integer of 5 to 50, and
R' is a bivalent alkyl or aryl or aralkyl or alkaryl or cycloalkyl radical.

5. The shaped structure of claim 4, wherein in the general formula said bivalent radical R' is

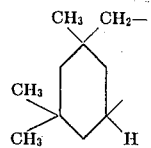

6. The shaped structure of claim 4, wherein in the general formula said bivalent radical R' is

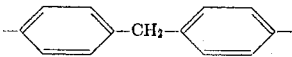

* * * * *